(12) United States Patent
Wilwers et al.

(10) Patent No.: US 11,897,441 B2
(45) Date of Patent: Feb. 13, 2024

(54) CONTROL SYSTEM AND METHOD FOR CONTROLLING AN ACTIVATION STATE OF A BRAKING-TORQUE ASSISTANCE SYSTEM FOR REDUCING INTAKE OF BRAKING ENERGY IN A SERVICE-BRAKE SYSTEM OF A VEHICLE

(71) Applicant: Ford Global Technologies, LLC, Dearborn, MI (US)

(72) Inventors: Thomas Wilwers, Colgne (DE); Thomas Svensson, Leichlingen (DE); Eugen Weber, Cologne (DE); Lowell Kubik, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 771 days.

(21) Appl. No.: 16/944,496

(22) Filed: Jul. 31, 2020

(65) Prior Publication Data

US 2021/0031738 A1    Feb. 4, 2021

(30) Foreign Application Priority Data

Aug. 1, 2019    (DE) .......................... 102019211498.9

(51) Int. Cl.
*B60T 8/17*    (2006.01)
*F16D 66/00*    (2006.01)
(Continued)

(52) U.S. Cl.
CPC ................. *B60T 8/17* (2013.01); *B60L 7/26* (2013.01); *B60T 1/02* (2013.01); *B60T 1/10* (2013.01);
(Continued)

(58) Field of Classification Search
CPC ..... B60T 8/17; B60T 1/02; B60T 1/10; B60T 8/171; B60T 13/74; B60T 17/221;
(Continued)

(56) References Cited

U.S. PATENT DOCUMENTS 8,033,955 B2    10/2011    Farnsworth
8,311,692 B2    11/2012    Mulot et al.
(Continued)

FOREIGN PATENT DOCUMENTS

WO    WO-2017202476 A1 * 11/2017 ............ B41F 13/016

OTHER PUBLICATIONS

Authors et al.: Disclosed Anonymously; "Warning system for a reduced braking torque from an auxiliary brake in a vehicle"; Sep. 26, 2003; ip.com; IPCOM000019727D (Year: 2003).*
(Continued)

*Primary Examiner* — Russell Frejd
*Assistant Examiner* — Ana D Thomas
(74) *Attorney, Agent, or Firm* — Burr & Forman LLP

(57) ABSTRACT

A method for controlling an activation state of a braking-torque assistance system for reducing intake of braking energy in a service-brake system of a vehicle includes capturing and evaluating a plurality of demand indications for a startup of the braking-torque assistance system. If the evaluation of the captured plurality of demand indications reveals a demand for the startup of the braking-torque assistance system, a plurality of operating conditions of the service-brake system are captures and evaluated over a monitoring period. If, in turn, the evaluation of the captured plurality of operating conditions reveals that an overheating of the service-brake system is imminent, the braking-torque assistance system is actuated and one or more deactivation conditions of the braking-torque assistance system are checked. If the deactivation conditions are satisfied, the braking-torque assistance system is deactivated.

16 Claims, 3 Drawing Sheets

Figure 1:
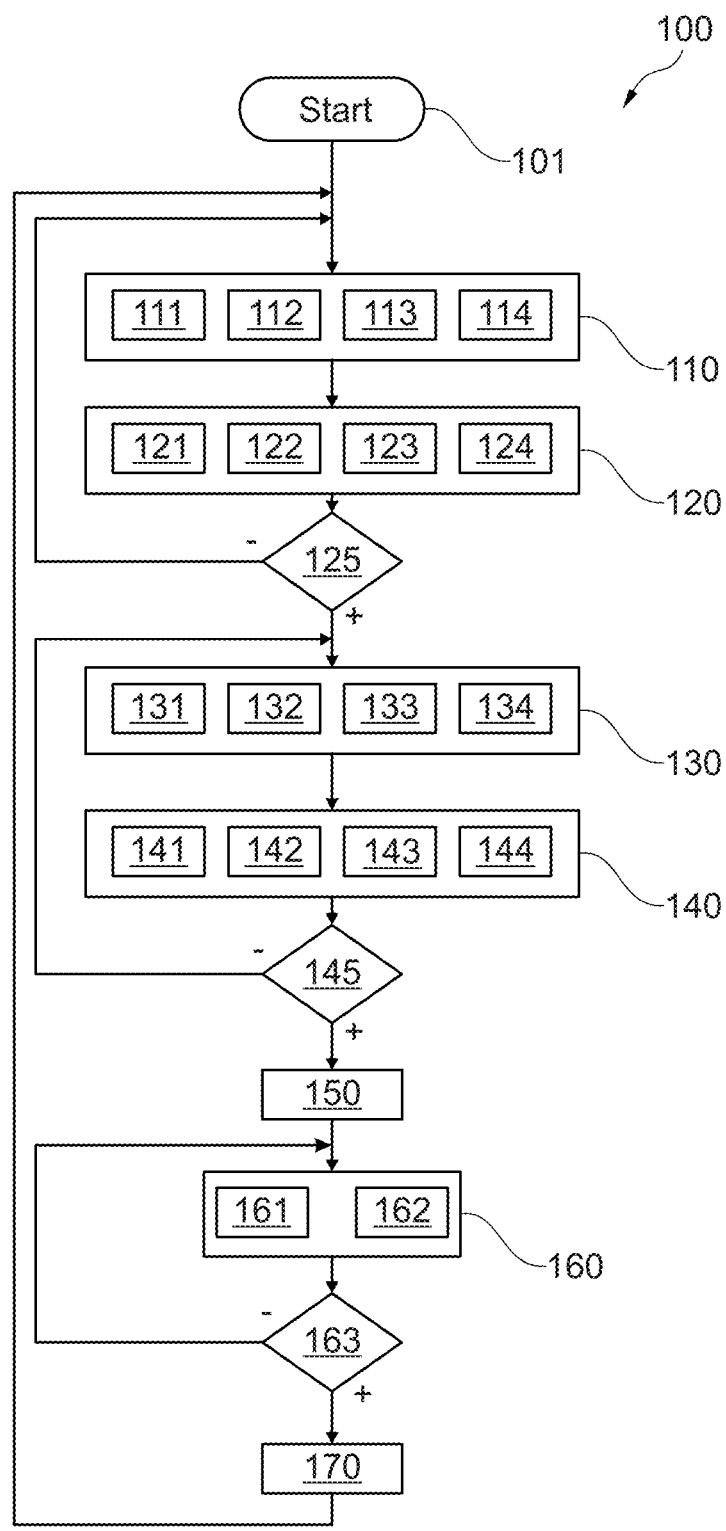

(51) Int. Cl.
*B60T 13/74* (2006.01)
*B60T 8/171* (2006.01)
*B60T 1/10* (2006.01)
*B60L 7/26* (2006.01)
*B60T 1/02* (2006.01)
*B60T 17/22* (2006.01)

(52) U.S. Cl.
CPC .............. *B60T 8/171* (2013.01); *B60T 13/74* (2013.01); *B60T 17/221* (2013.01); *F16D 66/00* (2013.01); B60T 2201/03 (2013.01); B60T 2210/30 (2013.01); B60T 2250/00 (2013.01); B60T 2250/04 (2013.01); B60T 2260/09 (2013.01); B60T 2270/402 (2013.01); F16D 2066/001 (2013.01)

(58) Field of Classification Search
CPC ............. B60T 2201/03; B60T 2210/30; B60T 2250/00; B60T 2250/04; B60T 2260/09; B60T 2270/402; B60L 7/26; F16D 66/00; F16D 2066/001
See application file for complete search history.

(56) References Cited

U.S. PATENT DOCUMENTS

| | | | |
|---|---|---|---|
| 8,886,430 | B2* | 11/2014 | Vollert .................. B60T 13/745 60/533 |
| 9,789,765 | B2 | 10/2017 | Miller et al. |
| 9,873,350 | B2 | 1/2018 | Martin et al. |
| 10,036,288 | B2 | 7/2018 | Leone et al. |
| 2014/0316669 | A1* | 10/2014 | Rudberg ............. B60W 10/198 701/70 |
| 2017/0106869 | A1* | 4/2017 | Lavoie ...................... B60T 7/20 |
| 2019/0061385 | A1* | 2/2019 | Valles Casanova ..... B41J 33/52 |

OTHER PUBLICATIONS

Downhill Safety Assistance Control for Hybrid Electric Vehicles based on the Downhill Driver's Intention Mode, published in Jan. 2005, written by Yugong Luo and Long Chen.

* cited by examiner

CONTROL SYSTEM AND METHOD FOR CONTROLLING AN ACTIVATION STATE OF A BRAKING-TORQUE ASSISTANCE SYSTEM FOR REDUCING INTAKE OF BRAKING ENERGY IN A SERVICE-BRAKE SYSTEM OF A VEHICLE

TECHNICAL FIELD

Example embodiments generally relate to vehicle brakes and, more particularly, relate to a method for controlling an activation state of a braking-torque assistance system for reducing intake of braking energy in a service-brake system of a vehicle, a control system that has been set up for carrying out the method, and also to a vehicle with a service-brake system and with a braking-torque assistance system, the activation state of which is controlled by the control system.

BACKGROUND

Vehicles—in particular, motor vehicles such as passenger cars, trucks or buses—are provided with at least one braking system in order to decrease the speed of the vehicle during travel by brakes exerting a braking force or a braking torque on at least some of the wheels of the vehicle. This will be designated herein as the service-brake system. In addition to this, vehicles are usually also provided with a further braking system—for example, a handbrake, parking brake or locking brake—in order to prevent the vehicle at a standstill from rolling away. The vehicles may sometimes be electric vehicles or hybrid vehicles.

In certain driving situations—for instance, in the course of a hill descent over a relatively long period and/or on a roadway with a steep gradient and/or with a particularly heavily laden vehicle—the service-brake system may experience a major persistent supply of energy which, in particular, may be converted into thermal energy. If the system is using, for example, a brake fluid, the brake fluid may possibly be heated to above its boiling-point in this way. An excessive supply of heat may lead to a diminution and, in some circumstances, a failure of the braking action. In order to counteract this, the service-brake system may be dimensioned to be larger, and a cooling system may also be provided. However, brakes of larger dimensions and a cooling of the brakes increase the costs of the vehicle. Moreover, a brake-cooling system frequently has a disadvantageous influence on the flow resistance of the vehicle. Therefore the brakes and, where appropriate, the brake-cooling system should be dimensioned to be only as large as required.

In this connection, the demands can be reduced if, in particular driving situations such as the hill descent described above, the service-brake system can be relieved of its load by the supply of energy into the service-brake system being decreased and/or by energy additionally being dissipated by other means. Systems that make this possible will be designated herein as braking-torque assistance systems. But since, in turn, the options available for this purpose cannot be deployed under all circumstances (for example, regenerative braking relieving the load on the service-brake system by virtue of the electric motor acting in this situation as a generator in the case of an electric vehicle or hybrid vehicle only if the battery has not already been fully charged) or do not always enhance the ride comfort (for example, activation of the passenger-compartment heater or of other loads in an electric vehicle or hybrid vehicle, in order to consume electrical energy additionally, in order to decrease the battery charge, and in this way nonetheless to be able to deploy regenerative braking), a braking-torque assistance system is not to be activated unnecessarily but only if a particular driving situation was detected and this might lead to an overheating of the service-brake system.

U.S. Pat. No. 8,311,692 discloses a braking method for hybrid vehicles, in which a braking torque of an electric motor is compensated. In this case, the distribution between a hydraulic braking and braking by the electric motor is controlled.

U.S. Pat. No. 10,036,288 discloses a method with which regenerative braking power is harnessed in the case of an electric vehicle or hybrid vehicle, in order to heat up lubricating oils.

U.S. Pat. No. 9,789,765 discloses a method for hybrid vehicles, via which coolant is heated with an electrically operated heating element, the current being generated with the electric motor of the vehicle through regenerative braking.

U.S. Pat. No. 9,873,350 discloses a method for conditioning a vehicle battery that is capable of being charged with current generated by regenerative braking, in which an electrically operated cooling system for the battery is operated on demand with current generated by regenerative braking.

U.S. Pat. No. 8,033,955 discloses a method for regulating a speed of an electric vehicle in the course of hill descent, in which the speed is kept constant if neither the brake pedal nor the accelerator pedal is actuated.

In "Downhill safety assistance control for hybrid electric vehicles based on the downhill driver's intention model", Luo et al, Proceedings of the Institution of Mechanical Engineers, Part D: Journal of Automobile Engineering, January 2015, a braking-assistance system is presented, in which the characteristics of various drivers are taken into consideration.

With braking energy, other systems and loads of the vehicle can be supplied with energy. However, in this case it is the use of the energy that is the center of attention, and not the controlled "consumption" of the energy in certain driving situations, in order to withdraw said energy selectively from the service-brake system or not to supply it thereto, in order in this way to counteract a reduction of the functional performance of the service-brake system.

BRIEF SUMMARY OF SOME EXAMPLES

Some example embodiments may provide a method and a control system with which the activation states of a braking-torque assistance system for a service-brake system of a vehicle are controlled in straightforward manner, depending on the driving situation, in such a way that otherwise imminent instances of overheating of the service-brake system can be avoided.

In accordance with an example embodiment, a method for controlling an activation state of a braking-torque assistance system for reducing intake of braking energy in a service-brake system of a vehicle includes a capture and an evaluation of a plurality of demand indications for a startup of the braking-torque assistance system is provided. If the evaluation of the captured plurality of demand indications reveals a demand for the startup of the braking-torque assistance system, a starting takes place of a capture of a plurality of operating conditions of the service-brake system and of an evaluation of the captured plurality of operating conditions over a monitoring period. If, in turn, the evaluation of the captured plurality of operating conditions reveals that an overheating of the service-brake system is imminent, an activation of the braking-torque assistance system and a checking of one or more deactivation conditions of the braking-torque assistance system take place. If the one or the several deactivation conditions is/are satisfied, a deactivation of the braking-torque assistance system takes place.

BRIEF DESCRIPTION OF THE SEVERAL VIEWS OF THE DRAWING(S)

Figure 2:
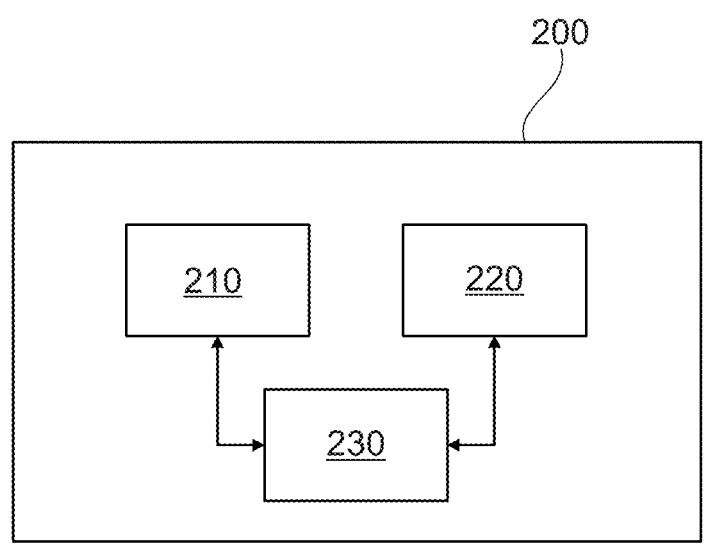
Figure 3:
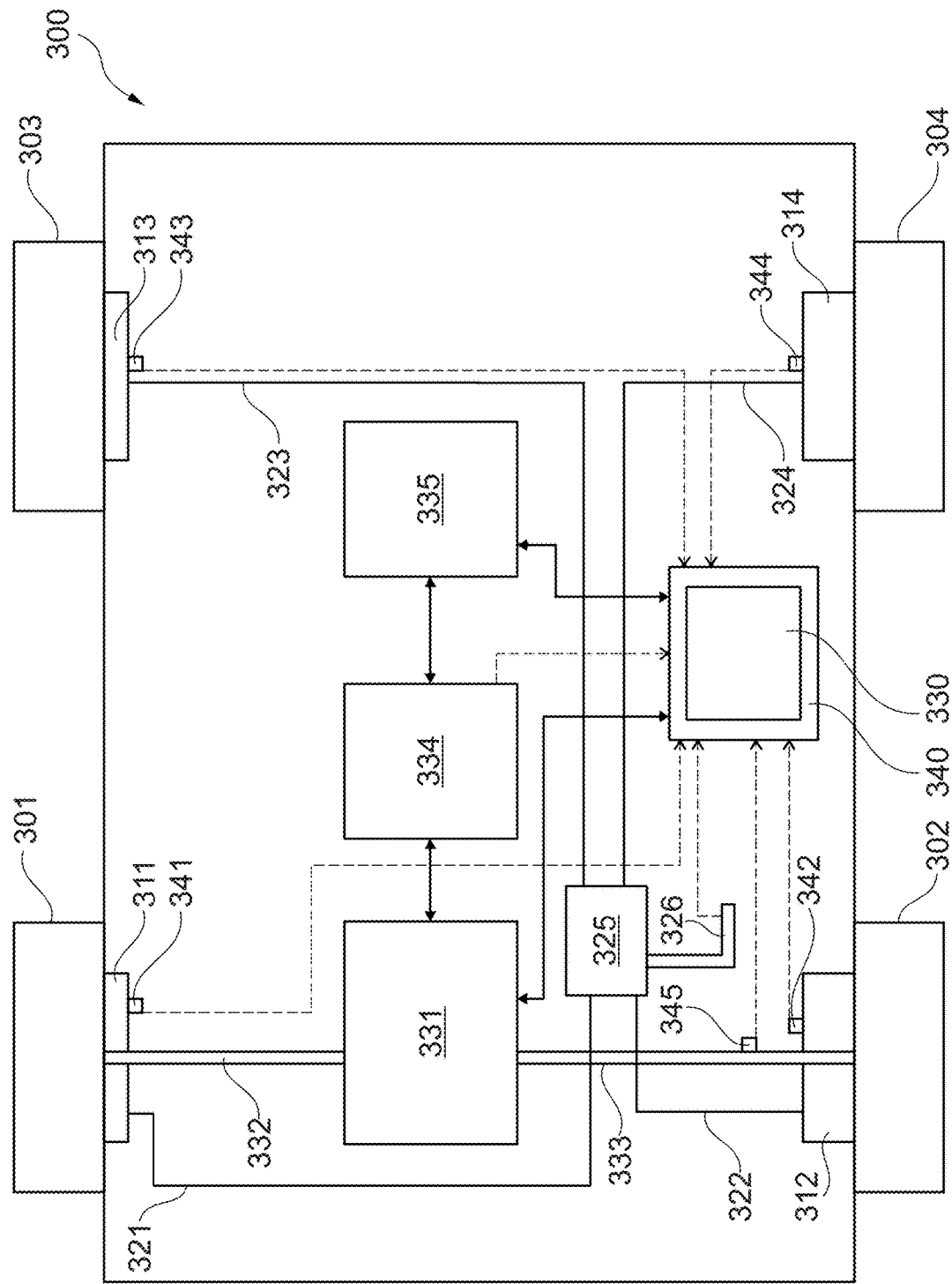

Having thus described the invention in general terms, reference will now be made to the accompanying drawings, which are not necessarily drawn to scale, and wherein:

FIG. 1 illustrates a schematic representation of an example of a method for controlling an activation state of a braking-torque assistance system for reducing intake of braking energy in a service-brake system of a vehicle in accordance with an example embodiment;

FIG. 2 illustrates a schematic representation of a first example of a vehicle with a control system for controlling an activation state of a braking-torque assistance system for reducing intake of braking energy in a service-brake system of a vehicle in accordance with an example embodiment; and FIG. 3 illustrates a schematic representation of a second example of a vehicle with a control system for controlling an activation state of a braking-torque assistance system for reducing intake of braking energy in a service-brake system of a vehicle in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

Some example embodiments described herein may provide a method for controlling an activation state of a braking-torque assistance system for reducing intake of braking energy in a service-brake system of a vehicle includes a capture and an evaluation of a plurality of demand indications for a startup of the braking-torque assistance system. If the evaluation of the captured plurality of demand indications reveals a demand for the startup of the braking-torque assistance system, a starting takes place of a capture of a plurality of operating conditions of the service-brake system and of an evaluation of the captured plurality of operating conditions over a monitoring period. If, in turn, the evaluation of the captured plurality of operating conditions reveals that an overheating of the service-brake system is imminent, an activation of the braking-torque assistance system and a checking of one or more deactivation conditions of the braking-torque assistance system take place. If the one or the several deactivation conditions is/are satisfied, a deactivation of the braking-torque assistance system takes place.

The activation states of the braking-torque assistance system may include "activated" and "deactivated", in which connection prior to the activation the startup of the braking-torque assistance system firstly has to take place. The startup takes place on demand—that is to say, if parameter values of the vehicle and of the service-brake system point to a driving situation in which, in the further progression, an excessive heating of the service-brake system might happen. Once the braking-torque assistance system has been put into operation, operating conditions of the vehicle and of its service-brake system are monitored over time, in order to activate the braking-torque assistance system as soon as the operating conditions indicate that an overheating of the service-brake system will occur without countermeasures in the course of constant further operation. Once the braking-torque assistance system has been activated, measures are carried out by said system, in order to reduce the further supply of energy into the service-brake system. Once the braking-torque assistance system has been activated, deactivation conditions—that is to say, operating conditions that indicate whether the braking-torque assistance system can be deactivated—are checked continuously or at regular intervals, in which connection "deactivation" may include taking it out of operation, so prior to a renewed activation a check is firstly made as to whether the prerequisites for the startup are satisfied. For the activation, over a monitoring period the operating conditions are captured and evaluated—that is to say, inspected in each instance—and, where appropriate, averaged over a constant period, for instance 30 seconds, 60 seconds or 90 seconds.

In this way, the braking-torque assistance system can be activated precisely in a purposeful manner in the driving situations—for instance, during a hill descent persisting for a long time—before the rise in temperature impairs the operational capability of the service-brake system. The braking-torque assistance system can be deactivated again directly if the deployment of the braking-torque assistance system has decreased the rise in temperature sufficiently or stopped it, or if the driving situation has changed. In order to detect the "hill descent" driving situation, the position and orientation of the vehicle could, for instance, be monitored with the aid of a GPS receiver (GPS=Global Positioning System). However, the determination of position and orientation with GPS is not always available. Some embodiments may be chosen that, for example, use temperature sensors and motion sensors or speed sensors (which are possibly already present and are comparatively inexpensive).

In an example embodiment, the capture of the plurality of demand indications may include a capture of a current speed of the vehicle and a capture of at least one associated current local temperature value of the service-brake system of the vehicle. Current local temperature values may be measured in the service-brake system at places where a heating is to be expected at first and/or most intensely. In the case of the deployment of disk brakes, current local temperature values can be captured (e.g., measured or recorded), for instance directly on the respective disk brake of the respectively associated wheels of the vehicle.

In an exemplary embodiment, the evaluation of the captured plurality of demand indications includes a checking of whether the at least one current local temperature value exceeds a first limiting temperature value of the service-brake system and the associated current speed lies within an operating range of the braking-torque assistance system. If, for instance, the captured current local temperature value at a brake of at least one of the wheels of the vehicle exceeds the assigned first limiting temperature value, there exists a demand for the startup of the braking-torque assistance system. The magnitude of the first limiting temperature value depends on the nature of the respective service-brake system of the vehicle, for instance on a boiling-temperature of a brake fluid being used, in which connection the first limiting temperature value is set to be lower than the actual critical temperature value starting from which the functional performance of the braking system would no longer be guaranteed. For many motor vehicles, a suitable first limiting temperature value may amount to between 180 degrees Celsius and 220 degrees Celsius, for instance 200 degrees Celsius. The startup of the braking-torque assistance system may take place only when the associated current speed lies within an operating range of the braking-torque assistance system. The operating range of the braking-torque assistance system may be dependent on the measures to be carried out by the braking-torque assistance system. If, for instance, in the case of an electric vehicle or hybrid vehicle the service-brake system is to be relieved of its load by regenerative braking with the electric motor, this has a sufficiently great effect only as from a system-dependent minimum speed of the vehicle. At the same time, this functionality may be available only up to a likewise system-dependent maximum speed. For many motor vehicles, a suitable lower limiting speed value of the operating range may amount to between 15 km/h and 25 km/h, for example 20 km/h, and a suitable upper limiting value may amount to between 45 km/h and 55 km/h, for example 50 km/h.

In an example embodiment, the capture of the plurality of operating conditions of the service-brake system may include a capture of a braking duration of an actuation of the service-brake system during the monitoring period, a capture of an average speed of the vehicle during the monitoring period, a capture of a motion duration in which the speed of the vehicle is greater than zero during the monitoring period, and a capture of a temperature-rise gradient of the at least one current local temperature value during the monitoring period. The actuation of the service-brake system may, for example, encompass the fact that a driver actuates the brake pedal. But the actuation may also take place automatically, for instance in the case of deployment of a braking-assistance system or the service-brake system of a vehicle driving autonomously. The capture of the temperature-rise gradient may take place indirectly by capture of the respective current temperature values during the time of motion of the vehicle during the monitoring period, during which time the service-brake system was actuated.

In an example embodiment, the evaluation of the captured plurality of operating conditions over the monitoring period reveals that an overheating of the service-brake system is imminent if the evaluation reveals that the braking duration during the monitoring period amounts to at least one minimum value of the braking duration, the average speed of the vehicle attains at least one lower limiting value for the average speed during the monitoring period and does not exceed an upper limiting value for the average speed, the motion duration during the monitoring period amounts to at least one minimum value of the motion duration, and the temperature-rise gradient attains at least one threshold value for the temperature-rise gradient. The operating conditions of the service-brake system indicate that the braking-torque assistance system should be activated, in order to counteract an imminent possible overheating, if the temperature-rise gradient exceeds an associated threshold value, provided that this is to be attributed to an actuation of the brakes, which ensured by a checking of the braking duration in conjunction with the checking, on the basis of the motion duration, of whether the vehicle was also in motion correspondingly, at least for a time, in which connection the braking-torque assistance system is only to be activated if the speed of the vehicle during the monitoring period lies, at least on average, within the operating range of the braking-torque assistance system. For many vehicles, a suitable minimum value of the braking duration may lie within the range from 75% to 85%, for instance 80%, of the duration of the monitoring period, and a suitable lower limiting value for the average speed may lie between 15 km/h and 25 km/h, for instance 20 km/h, and a suitable upper limiting value for the average speed may amount to between 45 km/h and 55 km/h, for instance 50 km/h, in which connection a suitable minimum value of the motion duration may amount to, for instance, between 85% and 95%, for example 90%, of the duration of the monitoring period. A threshold value for the temperature-rise gradient, which then points to a possible imminent overheating of the service-brake system, may then amount to, for instance, between 0.13 degree Celsius per second and 0.17 degree Celsius per second, for example 0.15 degree Celsius per second. In this way, without identifying the actual driving situation—for example, on the basis of data of a GPS receiver—as hill descent, an estimate can be made in straightforward manner—solely on the basis of temperature measurements, speed measurements and monitoring, for example of the actuation of the brake pedal—of whether countermeasures against an impending overheating of the service-brake system should be initiated.

In an example embodiment, the capture of the plurality of demand indications for the startup of the braking-torque assistance system includes, in addition, a capture of a current ambient temperature of the vehicle, for instance with an ambient-temperature sensor of the vehicle.

In an example embodiment, the evaluation of the captured plurality of demand indications includes, in addition, a checking of whether the captured current ambient temperature exceeds a threshold value of ambient temperature. Said threshold value may amount to, for instance, between 4 degrees Celsius and 6 degrees Celsius, for example 5 degrees Celsius. If the ambient temperature lies below this threshold value, more thermal energy is dissipated via the air, for instance, so under certain circumstances the deployment of the braking-torque assistance system is not required. On the other hand, depending upon the design of the braking-torque assistance system, under certain circumstances the functionality thereof at very low temperatures may not be available or may be available only insufficiently. If, for instance, there is provision to consume electrical energy additionally by activation of an electrically operated passenger-compartment heater, this is only possible if the passenger-compartment heater was in any case not already activated at maximum intensity by reason of the cold felt by the occupants of the vehicle.

Moreover, in one embodiment the capture of the plurality of demand indications for the startup of the braking-torque assistance system includes, in addition, a capture of a charging-capacity limit of an accumulator device—that is to say, a rechargeable battery device—of the vehicle.

In an example embodiment, the evaluation of the captured plurality of demand indications then includes, in addition, a checking of whether the captured charging-capacity limit exceeds a threshold value for the charging-capacity limit. The threshold value for the charging-capacity limit designates in this case a minimum value for the charging-capacity limit of the accumulator device. Once the accumulator device has already been almost fully charged, the possible charging capacity falls. If for an electric vehicle or hybrid vehicle there is provision to relieve the load on the service-brake system through the deployment of regenerative braking by the electric motor in the course of the operation of the braking-torque assistance system, this requires that the electrical energy generated by the regenerative braking can also be stored in the accumulator device, provided that this energy is not immediately "consumed"—that is to say, converted into other forms of energy—by other consumers of electrical energy. On the basis of the charging-capacity limit, it can be established whether and how much energy can still be stored in the accumulator device. If the threshold value—that is to say, here the minimum value—for the charging-capacity limit is not exceeded, the braking-torque assistance system should not be put into operation. In this sense, the checking of "demand indications" encompasses not only the checking of whether the startup of the braking-torque assistance system might be advantageous, but also whether this is possible.

In one embodiment, the checking of the one or more deactivation conditions of the braking-torque assistance system includes a checking of whether the at least one current local temperature value falls short of a second limiting temperature value of the service-brake system. The second limiting temperature value may, for instance, be identical with the first limiting temperature value which was exceeded for the startup of the braking-torque assistance system. But the second limiting temperature value is preferentially chosen to be less than the first limiting temperature value, for instance at 90% of the first limiting temperature value—that is to say, for instance, 180 degrees Celsius if the first limiting temperature value amounts to 200 degrees Celsius. In this way, it is ensured that the activated braking-torque assistance system has actually brought about a reduction of the current local temperature values if a deactivation of the braking-torque assistance system is carried out and the conditions for a startup after the deactivation are not satisfied again immediately.

Additionally, in an example embodiment the checking of the one or more deactivation conditions of the braking-torque assistance system may include a checking of whether, in addition, the captured charging-capacity limit falls short of the threshold value for the charging-capacity limit. If the deployment of the activated braking-torque assistance system has led to a reduction of the temperature and in the course of further operation the energy can no longer be readily stored as electrical energy, the braking-torque assistance system is deactivated.

In an example embodiment of the method there may be a provision that the activation of the braking-torque assistance system has the effect that a braking torque of a motor/engine of the vehicle is transmitted to one or more wheels of the vehicle. In this case, it may be a question of the regenerative braking, already cited previously, by an electric motor of the vehicle. But, depending upon the vehicle, it may also be a question of engine-braking by an internal-combustion engine of the vehicle. In one particular embodiment, in the case of hybrid vehicles there may even be provision to generate, both by an electric motor and by an internal-combustion engine, a braking torque which relieves the load on the service-brake system.

In an example embodiment, the activation of the braking-torque assistance system has the effect that one or more energy-consumption devices of the vehicle is/are activated. Energy-consumption devices are energy-conversion devices—that is to say, one form of energy is converted into other forms of energy. Particularly in the case of electric vehicles and hybrid vehicles, there may be provision that electrical energy-consumption devices—for instance, an electrically operated passenger-compartment heater, for instance a PTC auxiliary heater (PTC=Positive Temperature Coefficient) or a compressor of an air-conditioning system—are activated in order to convert electrical energy, in order to be able to store, in the battery or accumulator device of the vehicle, further electrical energy generated by regenerative braking.

Therefore in one example embodiment there is provision that the activation of the braking-torque assistance system has the effect that a heater and/or an air-conditioning system of the vehicle is/are activated.

But other devices of the vehicle may also have been set up to be activated by the braking-torque assistance system, in order to "consume" electrical energy or even, for example, to dissipate thermal energy directly from the service-brake system.

According to another aspect of some example embodiments of the invention, a control system for controlling an activation state of a braking-torque assistance system for reducing intake of braking energy in a service-brake system of a vehicle has been set up to execute steps of a method according to the first aspect of the invention. Consequently the advantages and special features of the method according to the invention for controlling an activation state of a braking-torque assistance system for reducing intake of braking energy in the service-brake system of a vehicle are also implemented within the framework of a suitable control system for controlling an activation state of a braking-torque assistance system for reducing intake of braking energy in the service-brake system of a vehicle.

In an example embodiment, the control system comprises a speed-sensor device, set up for capturing a current speed of the vehicle, a temperature-sensor device of the service-brake system, set up for capturing at least one associated current local temperature value of a service-brake system of the vehicle, and a control device, connected to the speed-sensor device and to the temperature-sensor device of the service-brake system and set up to start, if the at least one current local temperature value exceeds a first limiting temperature value of the service-brake system and the associated current speed lies within an operating range of the braking-torque assistance system, a capture of a plurality of operating conditions of the service-brake system, and to evaluate the captured plurality of operating conditions over a monitoring period, the control device being, in addition, set up to activate the braking-torque assistance system if the evaluation reveals that an overheating of the service-brake system is imminent, and the control device being, in addition, set up to check one or more deactivation conditions of the braking-torque assistance system and, if the one or the several deactivation conditions is/are satisfied, to deactivate the braking-torque assistance system.

For this purpose the control system includes, for instance, a logic circuit and at least one memory, in order to store set limiting values and threshold values. The control system may, additionally or alternatively, include a programmable apparatus with a processor and a memory, the memory containing, where appropriate, in addition to set limiting values and threshold values, instructions which, when they are executed by the processor, induce the latter to carry out or to induce steps of the method.

According to another aspect of some example embodiments of the invention, a vehicle is provided that exhibits a service-brake system, a braking-torque assistance system and a control system according to the second aspect of the invention for controlling an activation state of the braking-torque assistance system for reducing intake of braking energy in the service-brake system. Consequently the advantages and special features of the control system according to the invention for controlling an activation state of a braking-torque assistance system for reducing intake of braking energy in the service-brake system of a vehicle are also implemented within the framework of a suitable vehicle. The vehicle may, for example, be an electric vehicle or a hybrid vehicle.

FIG. 1 illustrates a schematic representation of an example of a method for controlling an activation state of a braking-torque assistance system for reducing intake of braking energy in a service-brake system of a vehicle, according to an example embodiment of the invention. The method 100 begins in a starting state 101, for instance as soon as the vehicle is started.

The method 100 then firstly provides a capture 110 of a plurality of demand indications for a startup of the braking-torque assistance system. In the embodiment shown, the capture 110 of the plurality of demand indications includes a capture of a current speed of the vehicle 111 and a capture of at least one associated current local temperature value of the service-brake system of the vehicle 112. In the embodiment shown, the capture 110 of the plurality of demand indications includes, in addition, a capture of a current ambient temperature of the vehicle 113 and also a capture of a charging-capacity limit of an accumulator device of the vehicle 114.

In a next step, an evaluation 120 of the captured plurality of demand indications for the startup of the braking-torque assistance system is then carried out. In the embodiment shown, the evaluation 120 of the captured plurality of demand indications includes a checking of whether the at least one current local temperature value exceeds a first limiting temperature value of the service-brake system 121 and also a checking of whether the associated current speed lies within an operating range of the braking-torque assistance system 122. In the embodiment shown, the evaluation 120 of the captured plurality of demand indications includes, in addition, a checking of whether the captured current ambient temperature exceeds a threshold value of ambient temperature 123 and also a checking of whether the captured charging-capacity limit exceeds a threshold value for the charging-capacity limit 124.

There follows a checking 125 of whether the evaluation 120 of the captured plurality of demand indications reveals a demand for the startup of the braking-torque assistance system. For this purpose, a check is made as to whether the evaluation 120 has revealed that all the conditions checked for the plurality of demand indications are satisfied. If the evaluation 120 of the captured plurality of demand indications reveals no demand for the startup of the braking-torque assistance system (labeled in FIG. 1 by "−"), the method is continued with the renewed capture 110 of the plurality of demand indications for the startup of the braking-torque assistance system. But if the evaluation 120 of the captured plurality of demand indications reveals a demand for the startup of the braking-torque assistance system (labeled in FIG. 1 by "+"), a starting takes place of a capture 130 of a plurality of operating conditions of the service-brake system, and of an evaluation 140 of the captured plurality of operating conditions over a monitoring period.

In the example embodiment shown, the capture 130 of the plurality of operating conditions of the service-brake system comprises a capture of a braking duration of an actuation of the service-brake system during the monitoring period 131, a capture of an average speed of the vehicle during the monitoring period 132, a capture of a motion duration in which the speed of the vehicle is greater than zero during the monitoring period 133, and a capture of a temperature-rise gradient of the at least one current local temperature value during the monitoring period 134.

In the example embodiment shown, the evaluation 140 of the captured plurality of operating conditions over the monitoring period may include a checking of whether the braking duration during the monitoring period amounts to at least one minimum value of the braking duration 141, a checking of whether the average speed of the vehicle attains at least one lower limiting value for the average speed during the monitoring period and does not exceed an upper limiting value for the average speed 142, a checking of whether the motion duration during the monitoring period amounts to at least one minimum value of the motion duration 143, and a checking of whether the temperature-rise gradient attains at least one threshold value for the temperature-rise gradient 144.

A checking 145 of whether the evaluation of the captured plurality of operating conditions reveals that an overheating of the service-brake system is imminent may then follow. For this purpose, a check may be made as to whether the evaluation 140 has revealed that all the conditions checked for the plurality of operating conditions are satisfied. If the evaluation 140 of the captured plurality of operating conditions reveals that no overheating of the service-brake system is imminent (labeled in FIG. 1 by "−"), the method may be continued with the renewed or continuous capture 130 of the plurality of operating conditions of the service-brake system. In other embodiments there may, for instance, also be provision to continue the method with method step 110— that is to say, each time firstly to check again whether the startup conditions continue to be satisfied. But if the evaluation of the captured plurality of operating conditions reveals that an overheating of the service-brake system is imminent (labeled in FIG. 1 by "+"), an activation 150 takes place of the braking-torque assistance system which, while it is activated, decreases the supply of thermal energy into the service-brake system by suitable measures.

In addition, a checking 160 of one or more deactivation conditions of the braking-torque assistance system takes place. In the example embodiment shown, the checking of the one or more deactivation conditions of the braking-torque assistance system includes a checking of whether the at least one current local temperature value falls short of a second limiting temperature value of the service-brake system 161. In the example embodiment shown, the checking of the one or more deactivation conditions of the braking-torque assistance system includes, moreover, a checking of whether, in addition, the captured charging-capacity limit falls short of the threshold value for the charging-capacity limit 162. There follows a checking 163 of whether the checking of the deactivation conditions reveals that the braking-torque assistance system can be deactivated 163. If the one or several deactivation conditions is/are not satisfied (labeled in FIG. 1 by "−"), the method may be continued with the continuous checking 160 of the deactivation conditions while the braking-torque assistance system activated in method step 150 continues to be active and counteracts the further heating of the service-brake system. If the one or the several deactivation conditions is/are satisfied (labeled in FIG. 1 by "+"), a deactivation 170 of the braking-torque assistance system takes place. In the embodiment shown, the deactivation 170 of the braking-torque assistance system also includes taking the braking-torque assistance system out of operation. Therefore after the deactivation of the braking-torque assistance system the method 100 is continued with the renewed capture 110 of the plurality of demand indications for the (renewed) startup of the braking-torque assistance system.

The method may terminate, for instance, with the deactivation of the motor/engine of the vehicle. In a further embodiment, in which the deactivation of the braking-torque assistance system does not also include taking it out of operation, the method 100 is continued not with method step 110 but with method step 130 of the capture of the plurality of operating conditions of the service-brake system, without the startup conditions being checked again at this point.

FIG. 2 illustrates a schematic representation of a first example of a vehicle with a control system for controlling an activation state of a braking-torque assistance system for reducing intake of braking energy in a service-brake system of a vehicle, according to a further embodiment of the invention. The vehicle 200 includes a service-brake system 210, a braking-torque assistance system 220 and a control system 230. The control system 230 is connected to the service-brake system 210 and to the braking-torque assistance system 220 and is designed to execute the method according to the invention and to control an activation state of the braking-torque assistance system 220, in order to reduce the intake of braking energy in the service-brake system 210 of the vehicle 200.

FIG. 3 illustrates a schematic representation of a second example of a vehicle with a control system for controlling an activation state of a braking-torque assistance system for reducing intake of braking energy in a service-brake system of a vehicle, according to a yet further embodiment of the invention. The vehicle 300 shown in FIG. 3 includes, like the vehicle 200 shown in FIG. 2, a service-brake system, a braking-torque assistance system and a control system that is designed to execute the method according to the invention and to control an activation state of the braking-torque assistance system, in order to reduce the intake of braking energy in the service-brake system of the vehicle 300.

In the example shown in FIG. 3, the vehicle is shown with four wheels 301, 302, 303, 304, and the service-brake system includes associated brakes 311, 312, 313, 314—for example, disk brakes—arranged on the wheels 301, 302, 303, 304, which via brake hoses 321, 322, 323, 324 filled with brake fluid are connected to a braking-force boosting device 325 which is connected to a braking-force transducer device 326—for example, a brake pedal capable of being operated by the driver.

The braking-torque assistance system in the example shown in FIG. 3 includes a braking-torque assistance device 330 connected to an electric motor 331 of the vehicle, said electric motor being designed to, on the basis of control commands from the braking-torque assistance device 330, not only merely drive the front wheels 301, 302 of the vehicle 300 via the front axle 332, 333 shown in FIG. 3 (the representation of a rear axle has been dispensed with), but also carry out a regenerative braking, and store the generated electric current in the accumulator device 334—that is to say, in the chargeable battery—of the vehicle 300, and promptly activate, as consumer 335 of electric current, at least one electrically operated comfort device—for example, a passenger-compartment heater or the compressor of an air-conditioning system—in order that current is consumed additionally.

In the example embodiment shown, the control system for the braking-torque assistance system includes a control device 340 which, for instance, may be a logic circuit or a programmable device with processor and memory. Since said device directly controls the braking-torque assistance device 330, in that it activates and deactivates the latter, it is realized, for example, as an integral part of the braking-torque assistance device 330. The control system may exhibit, moreover, a speed-sensor device 345, here represented in exemplary manner as a sensor on the front axle 333 driven by the electric motor 331, which is connected to the control device 340 in order to transmit its sensor signal, represented here as an arrow with a broken line, to the control device 340, the speed-sensor device 345 having been set up for capturing a current speed of the vehicle 300. The control system may also exhibit a temperature-sensor device of the service-brake-system, with temperature sensors 341, 342, 343, 344 which are arranged on the brakes 311, 312, 313, 314 and have been set up for capturing current local temperature values, the values being transmitted to the control device 340; cf. arrows with broken lines.

If one of the transmitted current local temperature values exceeds a first limiting temperature value of the service-brake system and the associated current speed lies within an operating range of the braking-torque assistance system, the control device 340 is configured to start a capture of a plurality of operating conditions of the service-brake system and to evaluate these operating conditions over a monitoring period, for instance 30 seconds, 60 seconds, 90 seconds or 120 seconds. If the evaluation reveals that an overheating of the service-brake system is imminent—for instance, the temperature is approaching the boiling-temperature of the brake fluid in the respectively associated brake hose 321, 322, 323, 324—the control device 340 activates the braking-torque assistance system. In this case, there is provision that the reaction time up until the activation of the braking-torque assistance system amounts to only a few seconds, for example only one to two seconds. Moreover, deactivation conditions are checked, and, if these conditions are satisfied, the braking-torque assistance system is deactivated again by the control device. In the embodiment shown, for this purpose the falling short of a second limiting temperature value which lies below the first limiting temperature value checked at the activation—for instance, amounting to 90% of the first limiting temperature value—is checked. In the embodiment shown, the charging-capacity limit of the accumulator device 334 is moreover captured, and a check is made as to whether a threshold value for the charging-capacity limit was fallen short of.

It will be understood that method steps, although described in accordance with a certain ordered sequence, could, in part, be executed in a sequence different from that described herein. It will be understood, furthermore, that certain steps may be carried out simultaneously or in succession, once or repeatedly, that other steps could be added, or that certain steps described herein could be omitted. In other words: the present descriptions are provided for the purpose of illustrating certain embodiments and should not be interpreted as a restriction of the disclosed subject-matter. The method steps will also be understood to be capable of being executed by processing circuitry of the vehicle. In this regard, a controller may be programmed to execute the specific steps described herein on the corresponding specific measurements and information, and then issue control commands based on evaluation of the measurements and information described herein to control the vehicle accordingly.

The figures are not necessarily accurate in every detail and true to scale, and may have been represented enlarged or reduced in size, in order to offer a better overview. Therefore functional particulars disclosed herein are not to be understood as being restrictive but merely as an intuitive basis which offers instruction to a person skilled in this field of technology to employ the present invention in diverse ways.

The expression "and/or" used herein, whenever it is utilized in a series of two or more elements, means that each of the listed elements may be used alone, or any combination of two or more of the listed elements may be used. If, for instance, a composition is described that contains the components A, B and/or C, the composition may contain A alone, B alone, C alone, A and B in combination, A and C in combination, B and C in combination, or A, B, and C in combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for controlling an activation state of a braking-torque assistance system for reducing intake of braking energy in the service-brake system of a vehicle, the method comprising:
    capturing and evaluating of a plurality of demand indications for a startup of the braking-torque assistance system;
    starting a capture of a plurality of operating conditions of the service-brake system and evaluation of the captured plurality of operating conditions over a monitoring period responsive to the evaluation of the captured plurality of demand indications revealing a demand for the startup of the braking-torque assistance system;
    activating the braking-torque assistance system and checking of one or more deactivation conditions of the braking-torque assistance system responsive to the evaluation of the captured plurality of operating conditions revealing that an overheating of the service-brake system is imminent; and
    deactivating the braking-torque assistance system responsive to the one or more deactivation conditions being satisfied.

2. The method according to claim 1, wherein capturing the plurality of demand indications comprises the following:
    capturing a current speed of the vehicle and
    capturing of at least one associated current local temperature value of the service-brake system of the vehicle.

3. The method according to claim 2, wherein evaluating the captured plurality of demand indications includes checking whether:
    the at least one current local temperature value exceeds a first limiting temperature value of the service-brake system, and
    the associated current speed lies within an operating range of the braking-torque assistance system.

4. The method according to claim 1, wherein capturing the plurality of operating conditions of the service-brake system comprises:
    capturing a braking duration of an actuation of the service-brake system during the monitoring period;
    capturing an average speed of the vehicle during the monitoring period;
    capturing a motion duration in which the speed of the vehicle is greater than zero during the monitoring period; and
    capturing a temperature-rise gradient of the at least one current local temperature value during the monitoring period.

5. The method according to claim 4, wherein evaluating the captured plurality of operating conditions over the monitoring period reveals that an overheating of the service-brake system is imminent responsive to the evaluation revealing that:
    the braking duration during the monitoring period amounts to at least one minimum value of the braking duration,
    the average speed of the vehicle attains at least one lower limiting value for the average speed during the monitoring period and does not exceed an upper limiting value for the average speed,
    the motion duration during the monitoring period amounts to at least one minimum value of the motion duration, and
    the temperature-rise gradient attains at least one threshold value for the temperature-rise gradient.

6. The method according to claim 1, wherein capturing the plurality of demand indications for the startup of the braking-torque assistance system includes, in addition, capturing a current ambient temperature of the vehicle.

7. The method according to claim 6, wherein evaluating the captured plurality of demand indications includes, in addition, a checking whether the captured current ambient temperature exceeds a threshold value of ambient temperature.

8. The method according to claim 1, wherein capturing the plurality of demand indications for the startup of the braking-torque assistance system includes, in addition, capturing a charging-capacity limit of an accumulator device of the vehicle.

9. The method according to claim 8, wherein evaluating the captured plurality of demand indications includes, in addition, checking whether the captured charging-capacity limit exceeds a threshold value for the charging-capacity limit.

10. The method according to claim 1, wherein checking the one or more deactivation conditions of the braking-torque assistance system includes checking whether the at least one current local temperature value falls short of a second limiting temperature value of the service-brake system.

11. The method according to claim 10, wherein checking the one or more deactivation conditions of the braking-torque assistance system includes checking whether, in addition, the captured charging-capacity limit falls short of the threshold value for the charging-capacity limit.

12. The method according to claim 1, wherein activating the braking-torque assistance system causes a braking torque of a motor/engine of the vehicle to be transmitted to one or more wheels of the vehicle.

13. The method according to claim 1, wherein activating the braking-torque assistance system causes one or more energy-consumption devices of the vehicle to be activated.

14. The method according to claim 13, wherein activating the braking-torque assistance system causes a heater and/or an air-conditioning system of the vehicle to be activated.

15. A control system for controlling an activation state of a braking-torque assistance system for reducing intake of braking energy in the service-brake system of a vehicle, the control system comprising processing circuitry configured for:
    capturing and evaluating of a plurality of demand indications for a startup of the braking-torque assistance system;
    starting a capture of a plurality of operating conditions of the service-brake system and evaluation of the captured plurality of operating conditions over a monitoring period responsive to the evaluation of the captured plurality of demand indications revealing a demand for the startup of the braking-torque assistance system;
    activating the braking-torque assistance system; and
    checking of one or more deactivation conditions of the braking-torque assistance system responsive to the evaluation of the captured plurality of operating conditions revealing that an overheating of the service-brake system is imminent; and
    deactivating the braking-torque assistance system responsive to the one or more deactivation conditions being satisfied.

16. A vehicle comprising:
    a service-brake system;
    a braking-torque assistance system; and
    a control system for controlling an activation state of the braking-torque assistance system for reducing intake of braking energy in the service-brake system, the control system comprising processing circuitry configured for:
    capturing and evaluating of a plurality of demand indications for a startup of the braking-torque assistance system;
    starting a capture of a plurality of operating conditions of the service-brake system and evaluation of the captured plurality of operating conditions over a monitoring period responsive to the evaluation of the captured plurality of demand indications revealing a demand for the startup of the braking-torque assistance system;
    activating the braking-torque assistance system and checking of one or more deactivation conditions of the braking-torque assistance system responsive to the evaluation of the captured plurality of operating conditions revealing that an overheating of the service-brake system is imminent; and
    deactivating the braking-torque assistance system responsive to the one or more deactivation conditions being satisfied.

\* \* \* \* \*